Figure 1:
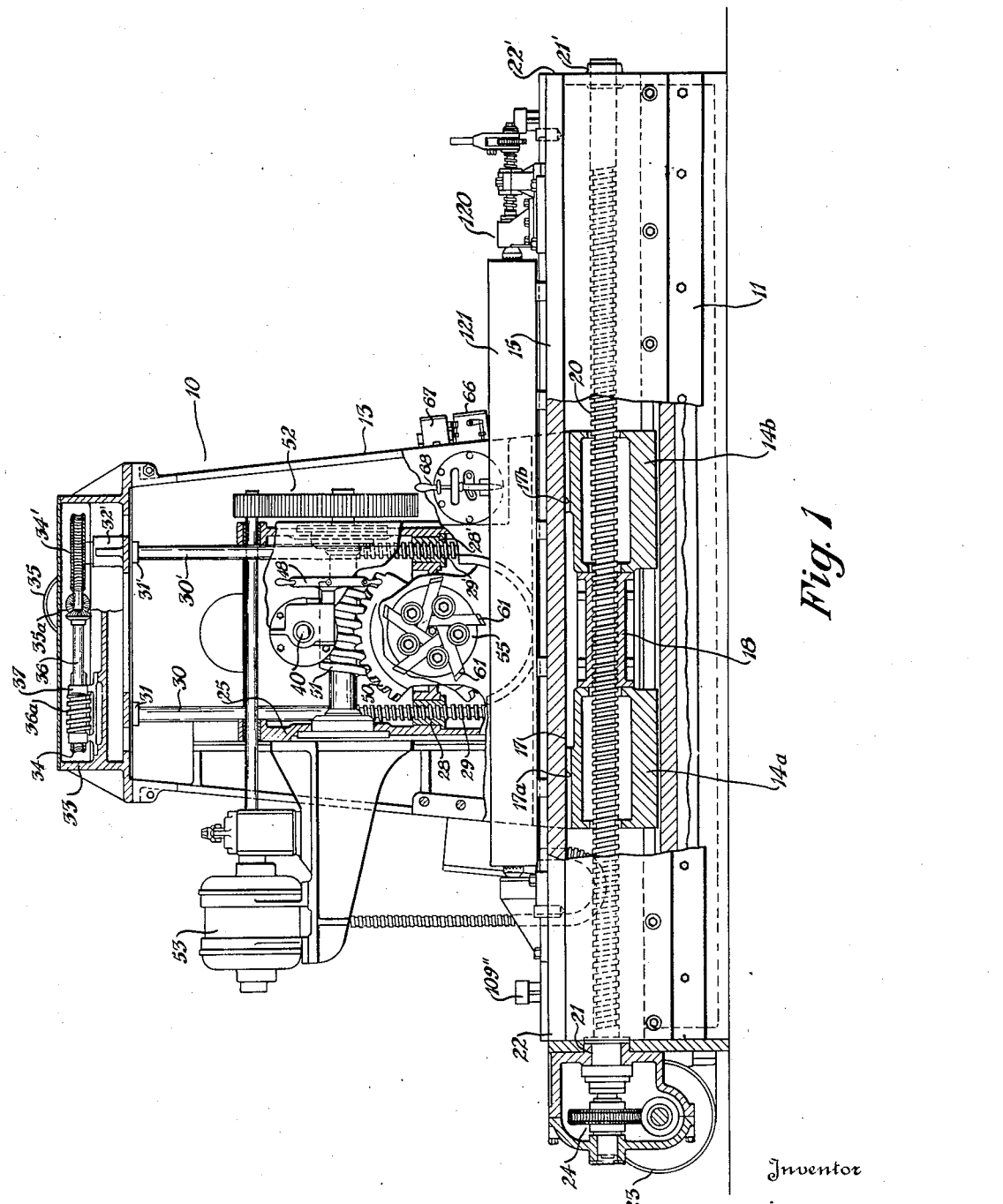

May 10, 1932.  G. W. LENTZ  1,857,464
CHIPPING MACHINE.
Filed July 3, 1930   8 Sheets-Sheet 1

Inventor
G. W. Lentz
By Frease and Bishop
Attorneys

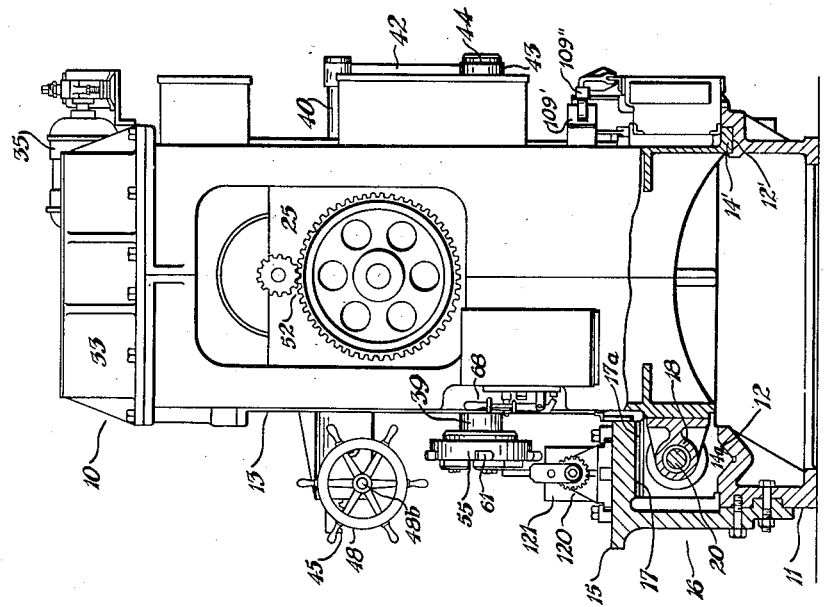
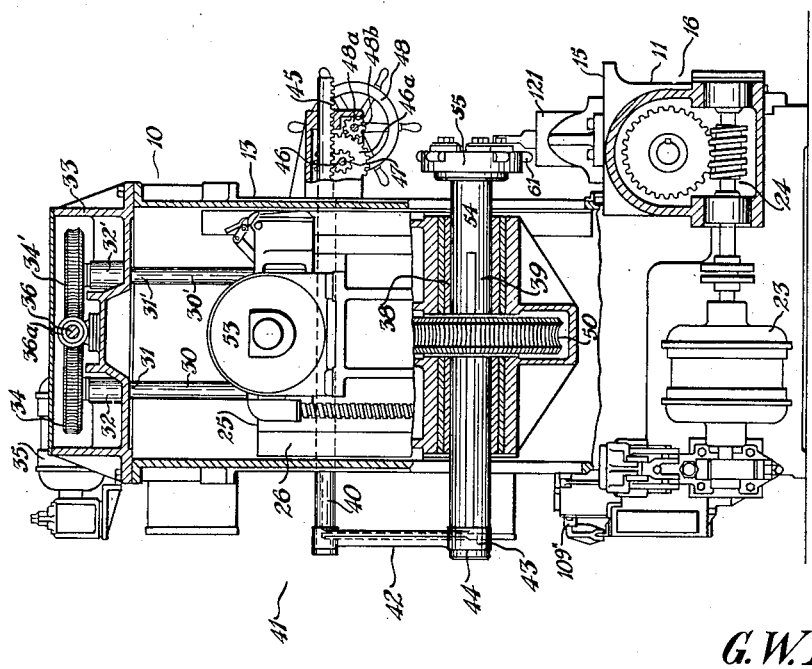

May 10, 1932.     G. W. LENTZ     1,857,464
CHIPPING MACHINE
Filed July 3, 1930     8 Sheets-Sheet 4

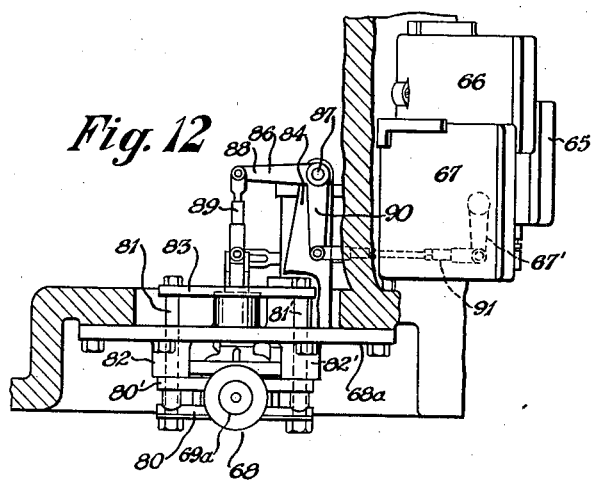
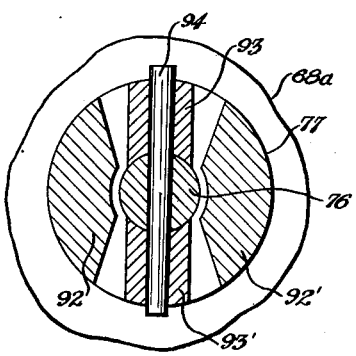
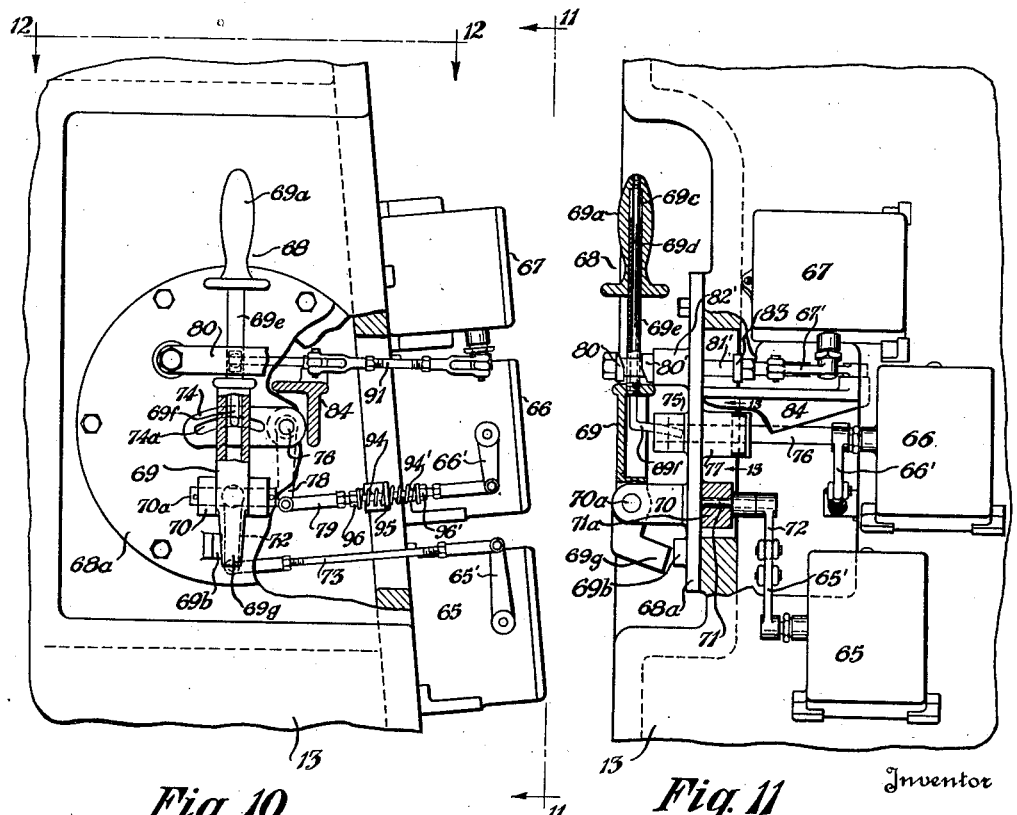
Fig. 12
Fig. 13
Fig. 10
Fig. 11

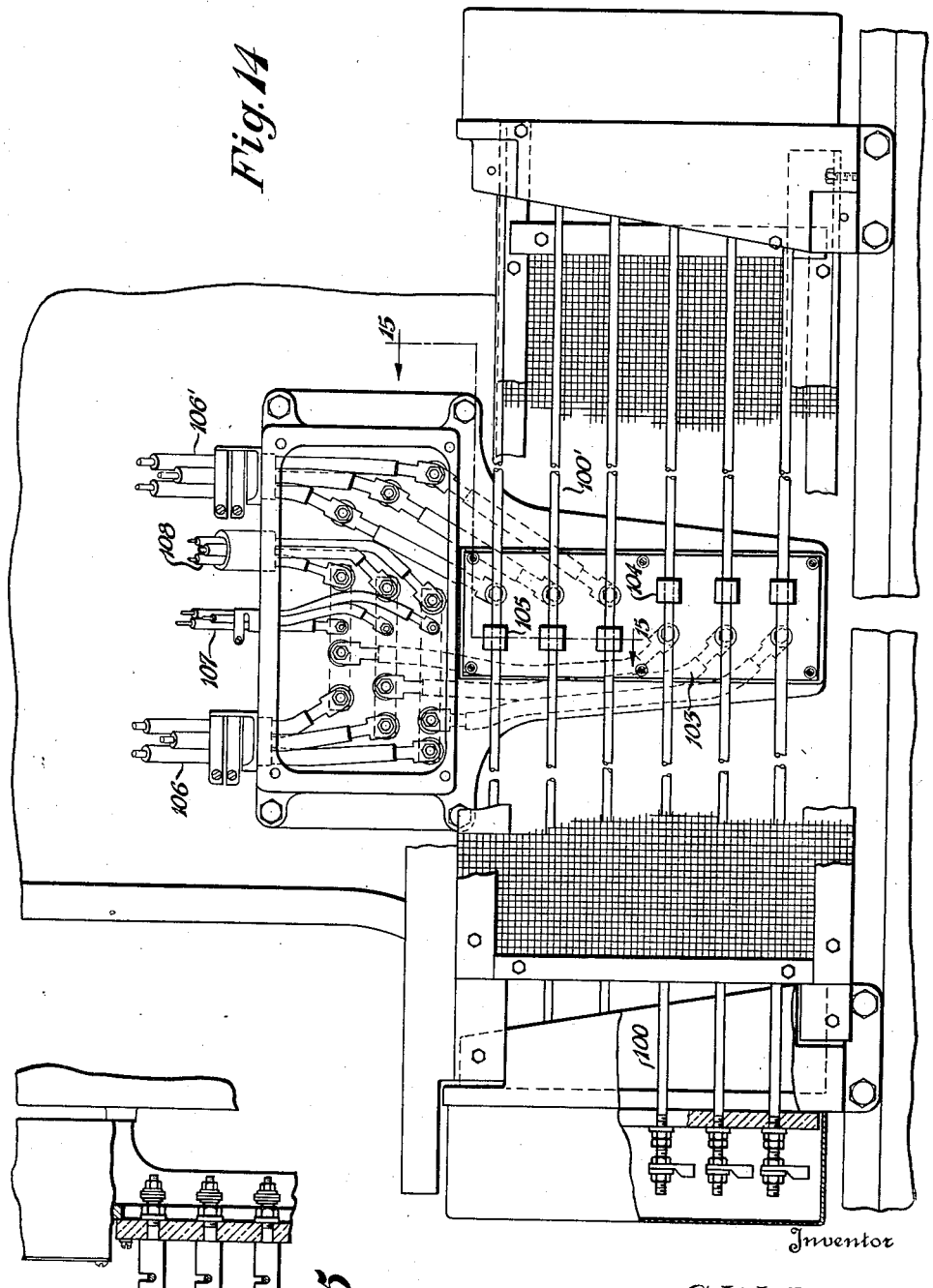

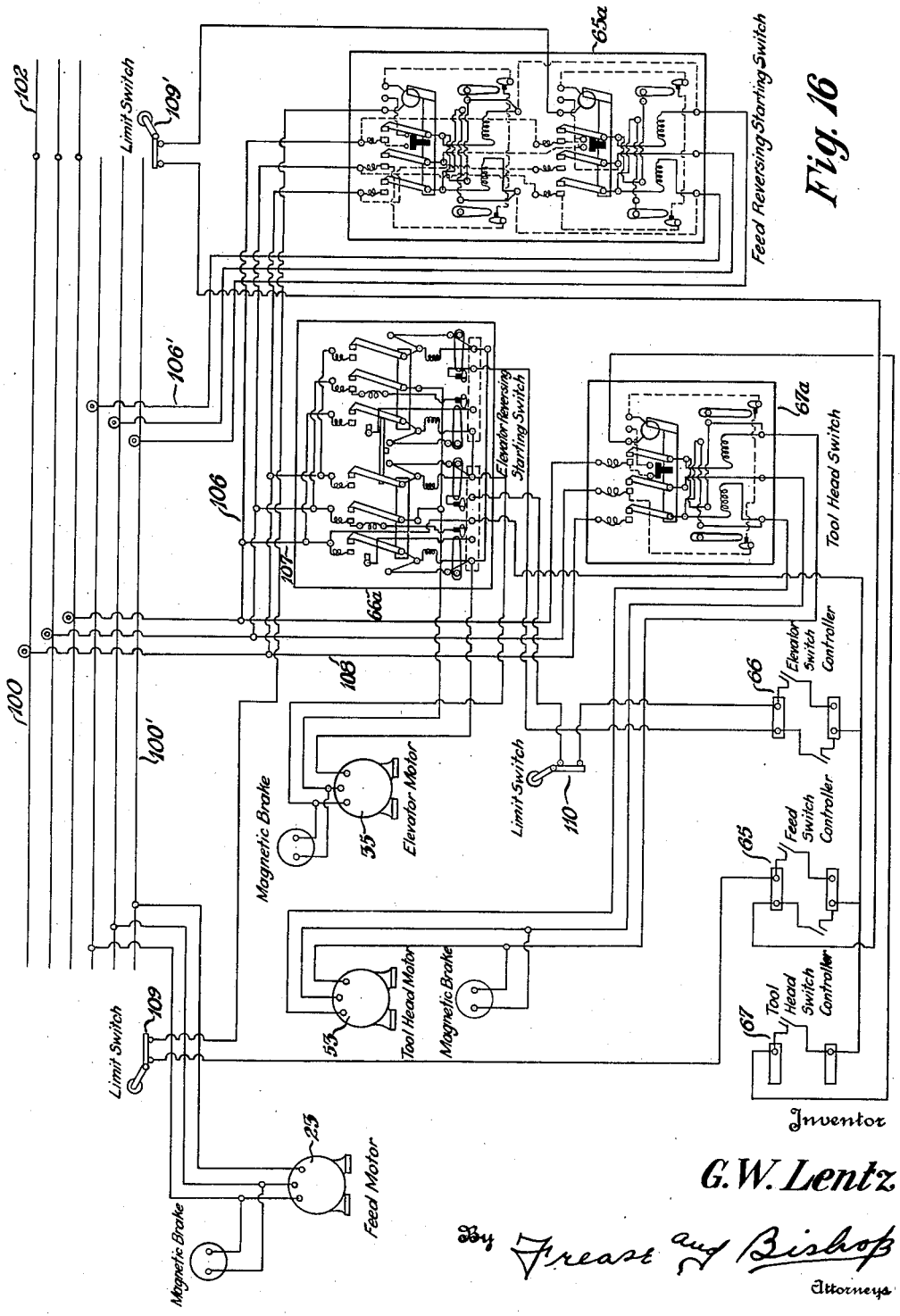

May 10, 1932.  G. W. LENTZ  1,857,464
CHIPPING MACHINE
Filed July 3, 1930   8 Sheets-Sheet 8
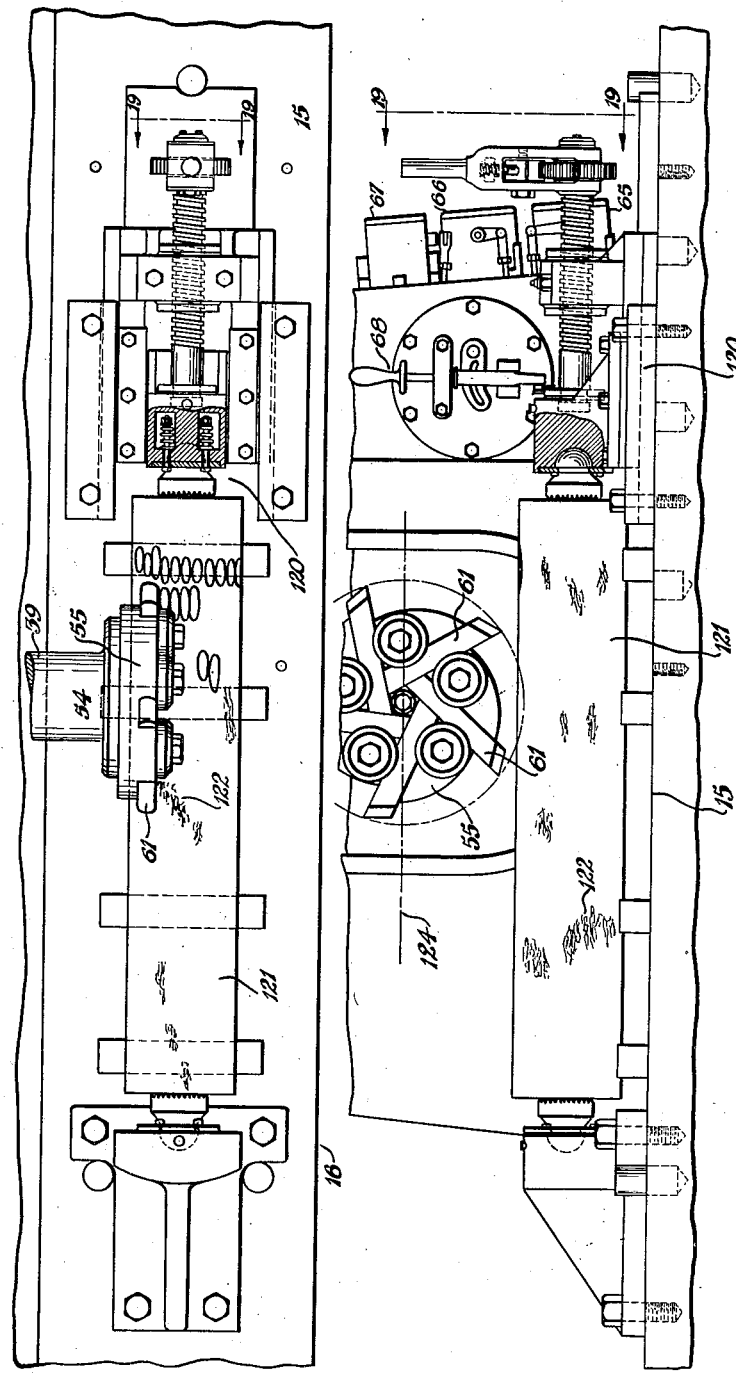
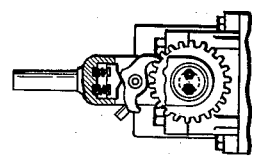
Inventor
G.W. Lentz
By Frease and Bishop
Attorneys Patented May 10, 1932

1,857,464

UNITED STATES PATENT OFFICE

GEORGE W. LENTZ, OF CANTON, OHIO, ASSIGNOR TO THE BONNOT COMPANY, OF CANTON, OHIO, A CORPORATION OF OHIO

CHIPPING MACHINE

Application filed July 3, 1930. Serial No. 465,582.

My invention relates to machines for removing surface material from solids, and more particularly for removing surface defects from semi-finished rolling mill products, such as billets, and the present invention includes a continuation of common subject matter set forth in my prior application for United States Letters Patent for chipping machines, filed November 26, 1928, Serial No. 321,881.

The surface defects of semi-finished rolling mill products include scale, seams, slivers, snakes, scabs, and the like, and must be properly removed from the semi-finished product, if the finished product rolled therefrom is to be satisfactory.

The usual method of eliminating such surface defects, is by means of a manually operated portable pneumatic chipper.
Each of such chippers requires an operator, the work progress is slow, and it is very difficult if not impossible for any individual operator to remove all surface defects in a uniform and in the proper manner.
Moreover it is practically impossible to obtain uniform and proper work from the large number of operators required for chipping in the usual steel mill.

It has been proposed to provide special planing machines for removing the aforesaid defects from billets and the like, but in order to accommodate the larger billets, which may be 30 feet long, such a special planing machine requires a total floor space of over 55 feet in length, and the total floor space requirements for a sufficient number of such planing machines to accommodate the capacity of a usual steel mill is prohibitive.

Moreover the moving table of such a special planing machine, requires an excessive amount of power for its movement.

Furthermore, from the standpoint of safety, in a planing machine the end of a billet sometimes extends beyond the end of the table, and workmen have been injured by billets moving in this manner.

It has also been proposed to chip steel billets by the use of milling machines including cutters whose teeth rotate during cutting in a transverse plane or planes angular to the direction of longitudinal feeding movement of the carriage on which the teeth are operatively mounted; and in such machines the longitudinal feed is necessarily relatively slow.

In addition to the attempts, unsuccessful from the practical standpoint, to use milling machines and planers for chipping steel billets, it has also been proposed to use machine tools of the shaper type.

To be practically and commercially successful, any chipping machine for use in the regular production line of a steel mill, must have a high speed and great degree of flexibility of operation, and must be subject to the instantaneous control of a human operator.

It is to be noted that all machine tools of the milling type are generally similar; all machine tools of the planer type are generally similar; and all machine tools of the shaper type are generally similar.

It is obvious that any planer, any shaper, or any milling machine, if built in a sufficiently large size, could remove part or all of the surface of the billet.

The speed of operation of any such usual machine tool is so slow however, and its flexibility of operation is so restricted, that it has been utterly impractical to use any usual machine tool for chipping steel in the regular production line of a steel mill.

The objects of the present invention include the provision of an improved machine for chipping or removing surface material from solids, whereby the time of removing unit volume of surface material is decreased, and whereby the time of removing any desired quantity of surface material from the entire face of a solid such as a billet or the like is also decreased.

The objects of the invention further include the provision of a machine tool for carrying out chipping operations at a relatively high speed, and having a relatively great degree of flexibility of operation, and being instantaneously controllable by a human operator.

The objects of the invention further include the provision of a chipping machine in which the work, that is, the billet or other semi-finished rolled product, is stationarily mounted, and is operated on by a moving tool head.

Further objects of the invention include the provision of a moving tool head which is adapted for combining the movements of a milling machine and a shaper, for selectively imparting to the cutting tools on the head, a rotary and/or a translatory movement, whereby a tool may be rotated into the billet a suitable distance, after which a translatory movement of the tool will then remove all or a longitudinal portion of the surface defect regardless of its length, and a final rotary movement of the tool will remove the tool from the billet, or whereby material may be removed from the billet by continuous rotation of the tool, or by combined rotary and translatory movement of the tool.

Further objects of the invention include the provision of a novel arrangement of the various parts and controls for the chipping machine, wherein the means for controlling the translatory and rotary movements as well as the elevation of the tool are centralized and located on a moving carriage on which the moving tool head is operatively mounted, and whereby extreme rapidity and flexibility of operation of the machine is attained.

The foregoing and other objects are attained by the apparatus, parts, improvements, and combinations, which comprise the present invention, and which are particularly and distinctly pointed out and set forth in the appended claims forming part hereof.

In general terms, the improved machine of the present invention is adapted for removing surface material from a laterally and longitudinally extending surface, such as the face of a billet, in which the length breadth ratio of the surface may be relatively great, and the machine broadly includes means for removing laterally side by side segments of surface material, the material removing means including continuously rotating circumferentially spaced cutting tools whose axis of rotation remains in a plane of constant displacement from the face from which the surface material is being removed.

From another standpoint the improved machine may be described in general terms as including a bed, a carriage mounted for longitudinal movement on the bed, a rotating cutting tool on the carriage, the cutting movement of the cutting tool being in the same direction as the direction of longitudinal movement of the carriage, and the cutting tool being bodily movable laterally with respect to the work being cut by the cutting operations thereof and while maintaining the axis of rotation of the cutting tool in a plane of constant displacement from the face of the work being cut.

Figure 2:
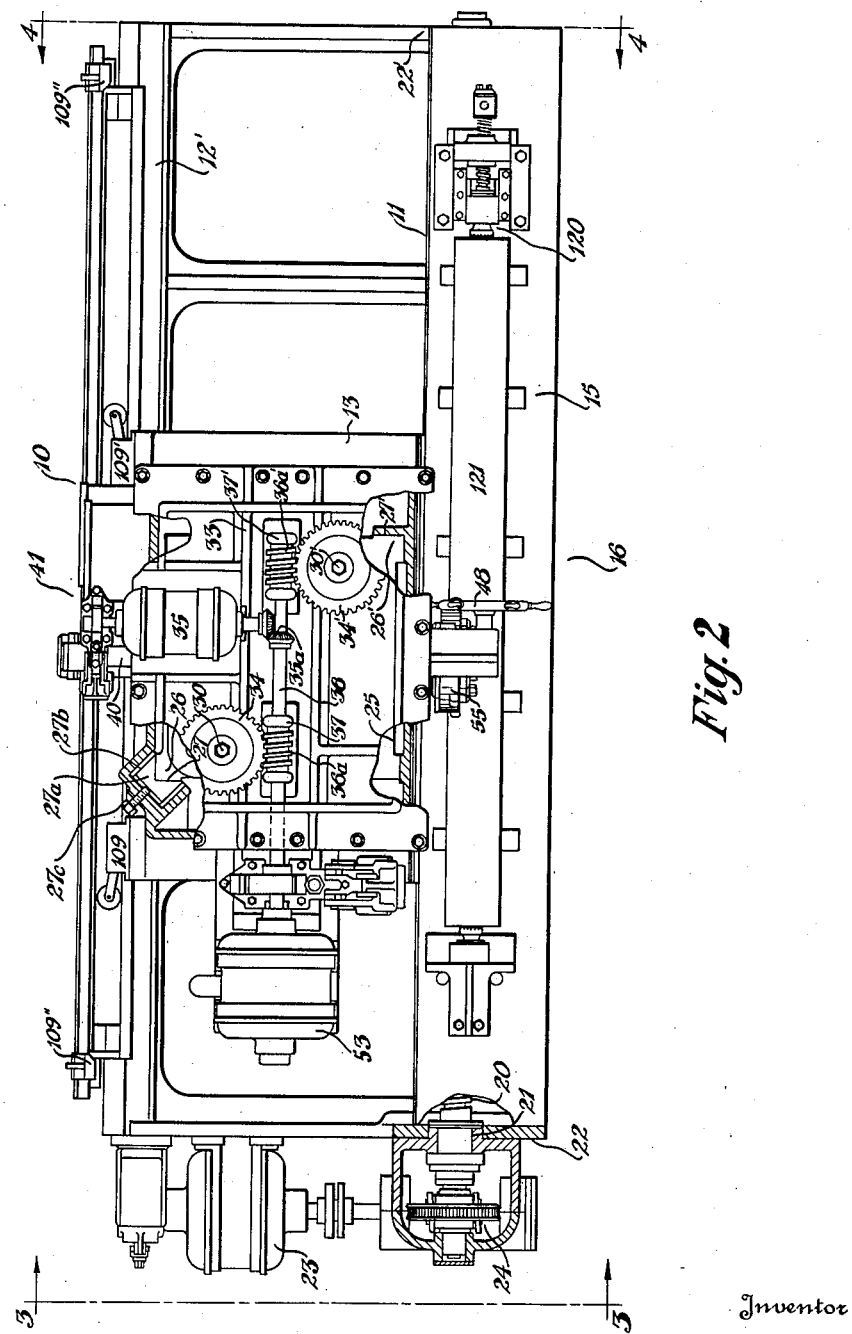
Figure 7:
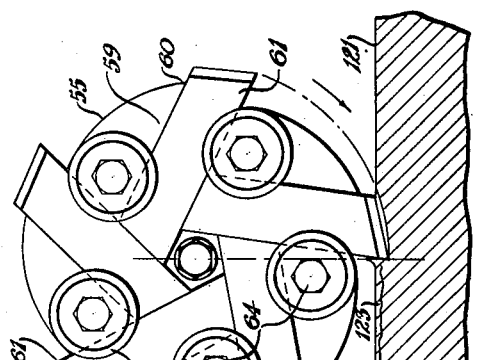
Figure 5:
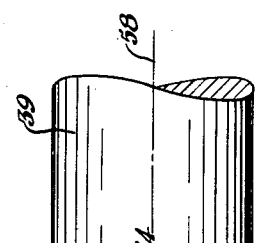

A preferred embodiment of the improved chipping machine is illustrated in the accompanying drawings forming part hereof, in which Figure 1 is a fragmentary side view of the work side of the preferred embodiment of the improved chipping machine;

Fig. 2, a fragmentary plan view thereof;

Fig. 3, a fragmentary view of one end thereof looking in the direction of the arrows 3—3, Fig. 2;

Fig. 4, another fragmentary end view thereof looking in the direction of the arrows 4—4, Fig. 2;

Fig. 5, a detached side elevation of the improved tool head for the improved chipping machine;

Fig. 6, an end elevation thereof, showing the clamping plate and the tools removed;

Fig. 7, a fragmentary view with distant parts removed, illustrating the tool head operating on a billet, after the completion of a tool inserting rotary milling cutting operation;

Fig. 8, a view similar to Fig. 7 illustrating the tool head during a translatory shaper cutting operation on the billet;

Fig. 9, a view similar to Figs. 7 and 8 illustrating the tool head at the end of a tool removing rotary cutting operation;

Fig. 10, a fragmentary enlarged elevation view similar to Fig. 1 illustrating the improved control mechanism for the machine;

Fig. 11, a fragmentary end elevation thereof looking in the direction of the arrows 11—11, Fig. 10;

Fig. 12, a fragmentary plan sectional view thereof looking in the direction of the arrows 12—12, Fig. 10;

Fig. 13, a detached enlarged sectional view thereof as on line 13—13, Fig. 11;

Fig. 14, an enlarged fragmentary rear side elevation of the machine illustrating preferred details of construction and arrangement of the electrical feed apparatus for the preferred electric motors for driving the several component parts of the machine;

Fig. 15, a fragmentary sectional view thereof as on line 15—15, Fig. 14;

Fig. 16, a diagram illustrating the electrical parts and the preferred wiring thereof for the machine;

Fig. 17, an enlarged fragmentary view similar to Fig. 1 illustrating a preferred billet mounting mechanism for rapidly handling a billet for surfacing more than one face thereof;

Fig. 18, a fragmentary plan view thereof; and

Fig. 19, a detached fragmentary view thereof as on lines 19—19, Figs. 17 and 18.

Similar numerals refer to similar parts throughout the drawings.

The improved chipping machine is indicated generally at 10, and includes a longitudinally extending bed 11, in upper surfaces of which are provided longitudinally extending carriageways 12 and 12'.

A tool head carriage 13 is mounted for longitudinally sliding in the ways 12 and 12' as by means of a set of longitudinally extending slide tongues 14a and 14b at one side, and a slide tongue 14' at the other side, the slide tongues depending from the carriage, and the tongues 14a and 14b being alined with each other and slidably fitting in the way 12 and the tongue 14' slidably fitting in the way 12'.

A longitudinally extending work supporting table 15 is provided at the work side 16 of the bed, and an upper longitudinally extending bearing surface 17 is formed in the bed 11, preferably above the way 12.

The alined slide tongues 14a and 14b are preferably longitudinally spaced from each other, and preferably extend laterally at the work side 16 of the bed between the way 12 and the bearing surface 17, and the tongues 14a and 14b have formed thereon upper longitudinally extending bearing surfaces 17a and 17b sliding against the bed bearing surface 17.

A longitudinally extending feed nut 18 is secured to the carriage 13 preferably between the slide tongues 14a and 14b, and has screwed therein a longitudinal feed screw 20 which is journalled at 21 and 21' in the bed ends 22 and 22', respectively.

A reversing motor 23 is connected preferably by worm and wheel reduction gearing indicated generally at 24 with the feed screw 20 for rotating the same for longitudinally feeding or sliding the carriage 13 in one direction or the other in the bed ways.

A tool head elevator 25 is mounted for vertical movement upwards and downwards in the carriage 13, as by means of vertically extending diagonally opposite guide tongues 26 and 26', which extend outwardly from the elevator and are slidably mounted, respectively, in vertically extending diagonally opposite grooves 27 and 27' formed in the carriage 13.

The groove 27 is preferably formed in a diagonally adjustable guide member 27a which is mounted for diagonal adjustment in the carriage 13, and fits in the diagonally opening trough 27b, adjusting screws 27c being screwed in suitable threaded apertures formed in the carriage 13 for applying any desired pressure on the guide member 27a, and thus on the elevator 25.

Preferably at the lower end of the elevator 25, laterally spaced elevator nuts 28 and 28' are secured, and one of the nuts is right hand and the other nut is left hand; and in the nuts 28 and 28', respectively, are screwed the lower threaded ends 29 and 29' of elevator screw shafts 30 and 30'. The upper ends 31 and 31' of the shafts are journalled in suitable bearings 32 and 32' formed in a preferably removable top frame 33 of the carriage 13, and worm wheels 34 and 34' are secured, respectively, on the upper ends of the screw shafts above the bearings 32 and 32', one of the worm wheels being rotated right hand and the other being rotated left hand.

A reversing elevator motor 35 is mounted on the carriage top plate, and is provided with a preferably bevel gear driving connection 35a with an elevator worm shaft 36, which is journalled in bearings 37 and 37' on the carriage top frame 33, the elevator worm shaft 36 extending between the worm wheels 34 and 34', and worms 36a and 36a' are secured on the shaft 36 and mesh respectively with the worm wheels 34 and 34'.

Accordingly, the reversing elevator motor 35 will raise or lower the tool head elevator 25, depending upon the direction of rotation of the worm shaft 36.

The elevator 25 includes at its lower end a horizontally extending tool head shaft bearing 38, the axis of which extends transversely of and preferably at right angles to the vertical plane containing the longitudinal axis of the bed 11, and the vertical axis of the elevator 25.

A tool head shaft 39 is slidably journalled in the bearing 38, and means are provided for laterally and horizontally sliding the tool head shaft 39 endwise in its bearing 38, which may include a rack bar 40 vertically spaced from and parallel with the tool head shaft 39, and slidably mounted for horizontal lateral movement in the elevator 25.

At the back side 41 of the machine, an arm 42 is secured to the rack bar 40 and extends vertically downwardly therefrom, and is provided at its lower end with a collar 43 which rotatably fits in a groove 44 formed in the back end of the tool head shaft 39.

At the work end of the rack bar 40, rack teeth 45 are formed and are meshed with a pinion 46 which is secured at the end of a shaft 47 journalled in the elevator 25, and the shaft 47 has also secured thereon a gear 46a which is preferably of greater diameter than the pinion 46, and which is meshed with a control pinion 48a secured upon a lateral control shaft 48b journalled in the elevator 25, and a lateral control wheel 48 is also secured on the control shaft 48b and positioned as illustrated at the work side of the carriage.

The foregoing gearing connection of the lateral control wheel 48 with the rack bar enables very easy and rapid movement of the tool head shaft 39 laterally and horizontally in the bearing 38.

The tool head shaft 39 slidably extends through a suitable aperture in a tool head shaft rotating worm wheel 50, which is journalled for rotation in the elevator 25; and the worm wheel 50 is meshed with a drive worm 51 which is driven through suitable gearing 52 by a tool head shaft rotating motor 53 mounted on the elevator 25.

Upon the work end 54 of the tool head shaft 39, a tool head 55 is removably secured, and there are formed in the outer end thereof, a plurality of tool mounting grooves 57, each groove extending at right angles with the axis of rotation 58 of the shaft 39 and head 55, and all the grooves being radially offset equal distances from the axis 58, so that the grooves make junctions with each other at equal angles.

A plurality of tool back-up zones 59 are thus formed on the outer end of the tool head, and each zone 59 may extend outwardly at 60 beyond the main cylindric surface of the tool head.

A cutting tool 61 fits in each groove 57, and the outer end 62 of the cutting tool may be ground, as illustrated, to make a gouge cut; and in accordance with the aforesaid positioning of the tool mounting grooves 57, each cutting tooth tool 61 is rotated by the shaft 39 or is moved by longitudinal movement of the carriage 13 in planes parallel with the longitudinal direction of movement of the carriage 13.

A clamping disk 63 is removably secured as by means of a cap screw 64 to the body of the tool head 55, each disk securely clamping one side of each of two tools 61.

A reversing starting switch controller 65 is mounted on the carriage 13 for controlling the longitudinal feed motor 23 preferably through a reversing starting switch 65a; a reversing starting switch controller 66 is similarly mounted on the carriage for controlling the elevator motor preferably through a reversing starting switch 66a; and a non-reversing starting switch controller 67 is similarly mounted on the carriage for controlling the tool head shaft rotating motor 53 preferably through a non-reversing starting switch 67a.

Fig. 16 illustrates diagrammatically the electrical wiring of the machine, and Fig. 14 illustrates the preferred apparatus for feeding electric power from the stationary bed through the movable carriage to the controllers, starting switches, and to the motors, and will be described in greater detail hereinafter.

The controllers 65, 66, and 67 are actuated, respectively, by the levers 65', 66', and 67' extending therefrom.

Common control means 68 for the elevator, for the longitudinal carriage feed, and for rotating the tool head, are provided and preferably include a mounting plate 68a removably mounted on the work-side wall of the carriage 13.

A control lever 69 is pivotally mounted in a yoke 70, as on a control lever shaft 70a for pivoting of the lever about an axis in a longitudinally extending vertical plane, and the yoke is mounted on the outer end of a yoke shaft 71 journalled in a bearing block 71a on the plate 68a for pivoting the yoke and the control lever about a laterally extending horizontal axis perpendicular to the longitudinally extending vertical plane.

A handle 69a is mounted for sliding upwards and downwards in the control lever 69.

As viewed in Figs. 1 and 10, and by means of the mechanisms illustrated in detail in Figs. 10, 11, and 12 and which will be described in detail hereinafter, movement of the handle 69a upwards serves to actuate the elevator controller 66 to cause the shaft of the elevator motor 35 to rotate to raise the elevator 25, and downward movement of the handle 69a reverses the motor 35 to lower the elevator 25.

Movement of the handle 69a laterally away from the carriage, actuates the tool head controller 67 to cause rotation of the tool head shaft rotating motor 53 to rotate the tool head from right to left for cutting as viewed in Fig. 1.

Movement of the control handle 69a longitudinally to the left as viewed in Figs. 1 and 10, actuates the longitudinal feed motor controller 65 to cause rotation of the longitudinal feed motor 23 to move the carriage to the left; while movement of the control handle 69a to the right reverses the motor 23 and thus moves the carriage to the right.

For preventing rotation of the cutting head during movement of the carriage to the right, a stop 69b is mounted on the carriage and prevents movement of the handle 69a laterally outwards from the carriage when the handle 69a is moved to the right.

A longitudinal feed controller actuating arm 72 is secured on the yoke shaft 71, and is connected by a link 73 with the lever 65' of the controller 65 for the longitudinal feed carriage motor 23.

The handle 69a preferably has formed therein a longitudinally extending bore 69c, within which is located a longitudinally extending elevator controller actuating rod 69d which is secured at its upper end to the upper end of the handle 69a.

The rod 69d is of substantially less diameter than the diameter of the bore 69c and a guide tube 69e is preferably secured at its lower end within an aperture at the upper end of the lever 69, and the guide tube 69e extends upwardly from the upper end of the lever 69 within the bore 69c of the handle 69a.

The rod 69d extends downwardly through the tube 69e, and the lower end 69f of the rod 69d is bent and extends towards the carriage and makes slidable operative engagement with one arm 74 of a bell crank 75, whose shaft 76 extends laterally and horizontally, and is journalled in a bearing block 77 mounted on the plate 68a.

The operative engagement of the end 69f of the elevator controller actuating rod 69d is preferably obtained by means of an arcuate slot 74a which is formed in the arm 74, and into which the actuating rod end 69f extends.

As illustrated in Figs. 1 and 10, the bell crank shaft 76 is at the right of the lever 69, and the other arm 78 of the bell crank 75 extends downwardly from the shaft, and its outer end is connected as by means of a link 79 with the outer end of the lever 66' of the elevator reversing starting switch controller 66.

The handle tube 69e extends upwardly through laterally spaced longitudinally extending guide and connecting bars 80 and 80', whereby the tube 69e may be freely longitudinally moved between the bars 80 and 80'.

The outer ends of the bars 80 and 80' are secured to the outer ends of longitudinally spaced horizontally and laterally extending slide rods 81 and 81', which are slidably mounted in slide bearing blocks 82 and 82', respectively, secured upon the plate 68a.

The inner ends of the slide bars 81 and 81' are secured to the outer ends of a longitudinally extending connecting bar 83.

A bracket 84 is secured to and extends inwardly from the inner face of the mounting plate 68a, and a bell crank 86 is mounted for rotation about a vertical pivot pin 87 supported at the outer end of the bracket 84.

One arm 88 of the bell crank 86 is operatively connected as by means of a link 89 with the connecting bar 83. and the other arm 90 of the bell crank 86 is operatively connected as by means of a link 91 with the actuating lever 67' of the non-reversing tool head starting switch controller 67.

Means are preferably provided for limiting movement of the elevator controller actuating bell crank shaft 76, and are illustrated in Figs. 11 and 13 in detail, and which may include sectoral stops 92 and 92' formed on the inner end of the bearing block 77 at opposite sides of the shaft 76, and the radial faces of the sectoral stops 92 and 92' abut with opposite faces of stop arms 93 and 93' which are pinned to the shaft 76 as by means of a pin 94.

The controllers 65, 66, and 67 are preferably of the self neutralizing type, or neutralizing means may be provided for any of the controllers such as compression springs 94 and 94' which react at their opposed ends against a stop 95 secured to the carriage, and at their outer ends against stop nuts 96 and 96' screwed on threaded portions of the link 79.

In Figs. 1 and 10, the control lever 69 and handle 69a are illustrated in neutral position, and the wiring of the controllers, the starting switches, and the motors is such that the above described movements of the control lever cause the respective movements of the carriage, elevator, and tool head, it being noted that all of such movements are controlled and may be carried out simultaneously excepting that the tool head may not be rotated during non-feeding longitudinal movement of the carriage to the right as illustrated in Figs. 1, 7, 8, 9, 17, and 18.

The stop 69b preferably operates against an inwardly protruding tongue 69g on the lever 69 below the shaft 70a.

By the aforesaid centralized control means 68, the operations of the improved chipping machine 10 is rendered instantaneously controllable by the human operator using only one hand, and without looking at the control means at all.

Accordingly the operator's eyes may be fixed upon the surface being chipped, and the cutting tools of the tool head may be simultaneously or selectively rotated, fed longitudinally, and raised or lowered.

With the other hand, the operator may manipulate the lateral control wheel 48 and may change the lateral position of the cutting tools 61 during rotation of the tool head 55 for enabling a rapid removal of laterally extending surface defects as will be described in detail hereinafter.

In supplying electric power for the machine, it is preferred to mount two sets of stationary three phase conductors 100 and 100', on the back side of the machine as illustrated in Figs. 14 and 15.

The conductors 100 are connected to a three phase power line 102, and a distributing panel 103, is mounted on the rear side of the movable carriage 13, and includes a set of sliding contacts 104 slidably connecting with the conductors 100, and a set of sliding contacts 105 slidably connecting with the conductors 100'.

From the distributing panel 103 a three phase line 106 preferably leads through the longitudinal feed starting switch 65a and returns at 106' to the sliding contacts 105.

Another line 107 from the panel 103 feeds the elevator motor 35 through the starting switch 66a, and a line 108 from the panel 103 feeds the tool head rotating motor 53 through the starting switch 67a.

The stationary conductors 100' feed the longitudinal feed motor 23.

As illustrated on the wiring diagram, longitudinal movement of the carriage may be limited by limit switches 109 and 109' mounted at opposite ends on the carriage, and wired in a usual manner for breaking the longitudinal feed motor circuit when either limit switch is struck by stops 109" on the bed.

The movement of the elevator may be similarly controlled by a limit switch 110.

The work supporting table 15 is provided with means indicated generally at 120 for securing thereon the work, which may be a billet 121.

The billet 121 may have the surface defect indicated at 122, and after clamping the billet 121 as illustrated, the elevator is lowered to a position from which one of the tools 61 of the tool head may be rotated from right to left parallel to the longitudinal direction of movement of the carriage and angular to the upper work surface of the billet for cutting into the upper work surface of the billet to the translatory cutting position illustrated in Fig. 7.

If the defect is long, as illustrated, the carriage is then moved longitudinally from right to left, with the cutting head preferably maintained stationary so that the cutting tool 61 by its translatory longitudinal movement will longitudinally gouge out material 123 in the zone of the surface defect. After the particular cutting tool 61 has been moved longitudinally of the billet a sufficient distance to gouge out all of the material of the zone of the surface defect in the path of the tool, the tool head is further rotated from right to left as indicated in Fig. 9, removing the particular cutting tool from the billet and positioning the next tool ready for insertion to make another cut.

The groove thus cut by the cutting tool gradually slopes at its sides and ends and merges with the main surface of the billet, and there are no abrupt edges or overhangs, and thus the surface defect is properly removed for permitting satisfactory subsequent rolling of the billet.

It has been found in practice however, as illustrated in Figs. 17 and 18, that there may be a number of surface defects covering a substantial lateral width of the billet surface being worked on.

In order to attain the greatest speed of operation, the ends of the cutting tools 61, as illustrated, extend a substantial distance beyond the periphery of the head and are so circumferentially spaced from each other, and by operation of the elevator the periphery of the head is spaced free of the work and the speed of rotation of the cutting head is so fixed, that the lateral control wheel 48 may be used to laterally jump or move the tool head from one lateral position to another as one cutting tool leaves the work and before the next cutting tool enters the work, as illustrated in Fig. 17, without elevating the cutting head.

In other words, the improved machine of the present invention is adapted for removing surface material from a laterally and longitudinally extending surface of the billet by removing laterally side by side segments of surface material by the continuously rotating cutting tools whose axis of rotation remains in a plane of constant displacement from the face of the billet from which the surface material is being removed.

In Fig. 17 this plane of constant elevation of the axis of rotation of the cutting tool or tools is indicated by the dot-dash line 124.

It will be observed that by the operative mounting of the tool head for selective rotation on the carriage, and by operatively mounting the carriage for translatory movement on the bed, the outer end of each tooth tool on each tool head is adapted for cutting by selective movement of the carriage, rotation of the tool with the tool head, or combined movement of the carriage and rotation of the tool head.

I claim:

1. A machine tool including a bed, a carriage mounted for horizontal longitudinal movement on the bed, an elevator mounted for vertical movement on the carriage, a tooth tool operatively mounted on the elevator for selective rotation about an axis extending transversely of the direction of movement of the carriage, power means for rotating the tool, means for vertically moving the elevator on the carriage, power means for horizontally moving the carriage on the bed, and common control means for the tool rotating means, the carriage moving means, and the elevator moving means, the control means being located on the carriage adjacent the tool.

2. A machine tool including a bed, a carriage mounted for horizontal longitudinal movement on the bed, an elevator mounted for vertical movement on the carriage, a tooth tool operatively mounted on the elevator for selective rotation about an axis extending transversely of the direction of movement of the carriage, means for rotating the tool, means for vertically moving the elevator on the carriage, means for horizontally moving the carriage on the bed, and common control means for the tool rotating means, the carriage moving means, and the elevator moving means, the control means being located on the carriage adjacent the tool.

3. A machine tool including a bed, a carriage mounted for translatory movement on the bed, an elevator mounted for movement on the carriage towards and away from the bed, a tooth tool operatively mounted on the elevator for selective rotation about an axis extending transversely of the direction of movement of the carriage, means for rotating the tool, means for moving the elevator on the carriage, means for moving the carriage on the bed, and common control means for the tool rotating means, the carriage moving means, and the elevator moving means, the control means being located on the carriage adjacent the tool.

4. A machine tool including a bed, a carriage mounted for translatory longitudinal movement on the bed, an elevator mounted for movement on the carriage towards and away from the bed, a tooth tool operatively mounted on the elevator for selective rotation about an axis extending transversely of the direction of movement of the carriage, means for rotating the tool, means for moving the elevator on the carriage, means for moving the carriage on the bed, and control means for the carriage moving means, and the elevator moving means, the control means including an actuating handle operatively mounted so that movement of the handle longitudinally with respect to the bed controls movement of the carriage on the bed in the same direction as the longitudinal handle movement, and movement of the handle towards or away from the bed controls movement of the elevator towards or away from the bed.

5. A machine tool including a tool head operatively mounted for rotation about an axis, means for mounting work to be operated on by the tool, a plurality of tooth tools each secured to the tool head and each extending angularly to the axis of rotation of the tool head, each tool having an outer cutting end adapted for cutting into the work during rotation of the tool head, the cutting ends of successive tools being spaced from each other and being located a substantial distance beyond the periphery of the head so that during rotation of the tool head the cutting end of one tool will have left the work before the cutting end of the next tool has entered the work with the periphery of the head positioned free of the work, means for continuously rotating the tool head, and means for laterally moving the tool head with respect to the work whereby laterally side by side segments of material may be removed from the work by continuous rotation of the tool head and successive lateral movements thereof.

6. A machine tool including a tool head operatively mounted for rotation about an axis, means for mounting work to be operated on by the tool, a plurality of tooth tools each secured to the tool head and each extending angularly to the axis of rotation of the tool head, each tool having an outer cutting end adapted for cutting into the work during rotation of the tool head, the cutting ends of successive tools being spaced from each other and being located a substantial distance beyond the periphery of the head so that during rotation of the tool head the cutting end of one tool will have left the work before the cutting end of the next tool has entered the work with the periphery of the head positioned free of the work, means for continuously rotating the tool head, and means for moving the tool head longitudinally with respect to the work.

7. A machine tool including a tool head operatively mounted for rotation about an axis, means for mounting work to be operated on by the tool, a plurality of tooth tools each secured to the tool head and each extending angularly to the axis of rotation of the tool head, each tool having an outer cutting end adapted for cutting into the work during rotation of the tool head, the cutting ends of successive tools being spaced from each other and being located a substantial distance beyond the periphery of the head so that during rotation of the tool head the cutting end of one tool will have left the work before the cutting end of the next tool has entered the work with the periphery of the head positioned free of the work, and means for continuously rotating the tool head.

8. A machine tool including a tool head operatively mounted for rotation about an axis, means for mounting work to be operated on by the tool, a plurality of tooth tools each secured to the tool head and each extending angularly to the axis of rotation of the tool head, each tool having an outer cutting end adapted for cutting into the work during rotation of the tool head, the cutting ends of successive tools being spaced from each other and being located a substantial distance beyond the periphery of the head so that during rotation of the tool head the cutting end of one tool will have left the work before the cutting end of the next tool has entered the work with the periphery of the head positioned free of the work, means for continuously rotating the tool head, means for laterally moving the tool head with respect to the work whereby laterally side by side segments of material may be removed from the work by continuous rotation of the tool head and successive lateral movements thereof, and means for moving the tool head longitudinally with respect to the work.

9. A machine tool including a stationary bed, a carriage mounted for translatory movement on the bed, a tool head, a plurality of tooth tools secured on the tool head, the tool head being operatively mounted on the carriage for selective rotation about an axis extending transversely of the direction of movement of the carriage, means whereby each tooth tool may be operated for cutting by selective movement of the carriage, rotation of the tool head, or combined movement of the carriage and rotation of the tool head, means for mounting work to be operated on by the tools, and each tool having an outer cutting end adapted during rotation of the tool head for cutting into work secured in the mounting means, the cutting ends of successive tools being spaced from each other and being located a substantial distance beyond the periphery of the head so that during rotation of the tool head the cutting end of one tool will have left the work before the cutting end of the next tool has entered the work with the periphery of the tool head positioned free of the work.

10. A machine tool including a stationary bed, a carriage mounted for translatory movement on the bed, a tool head, a plurality of tooth tools secured on the tool head, the tool head being operatively mounted on the carriage for selective rotation about an axis extending transversely of the direction of movement of the carriage, means whereby each tooth tool may be operated for cutting by selective movement of the carriage, rotation of the tool head, or combined movement of the carriage and rotation of the tool head, means for mounting work to be operated on by the tools, and each tool having an outer cutting end adapted during rotation of the tool head for cutting into work secured in the mounting means, the cutting ends of successive tools being spaced from each other and being located a substantial distance beyond the periphery of the head so that during rotation of the tool head the cutting end of one tool will have left the work before the cutting end of the next tool has entered the work with the periphery of the tool head positioned free of the work, and means for moving the tool head in the direction of its axis of rotation and laterally with respect to the work whereby laterally side by side segments of material may be removed from the work by continuous rotation of the tool head and successive lateral movements thereof.

In testimony that I claim the above, I have hereunto subscribed my name.

GEORGE W. LENTZ.